Patented Aug. 5, 1941

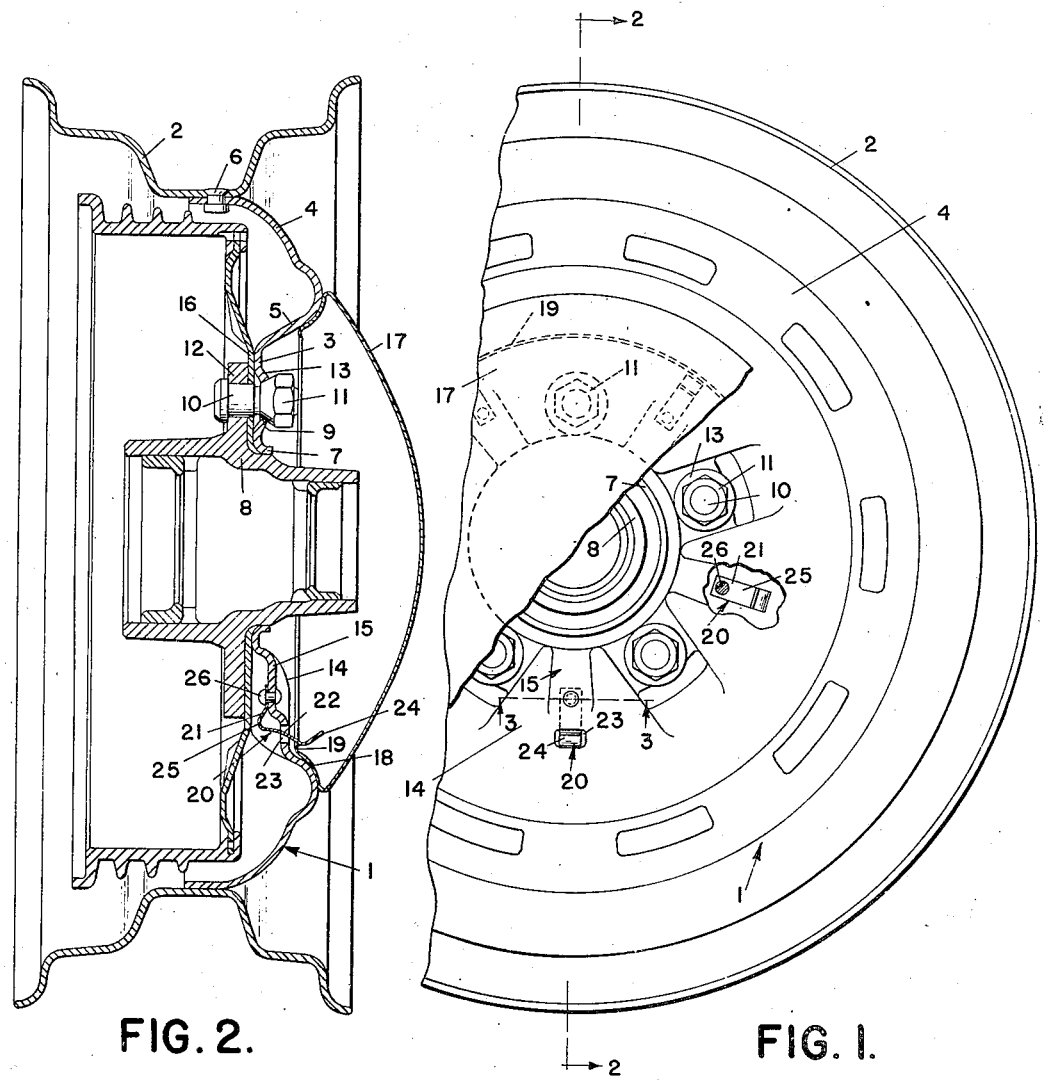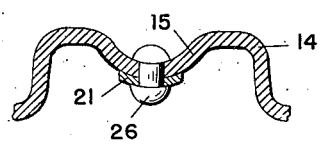

2,251,754

UNITED STATES PATENT OFFICE 2,251,754

VEHICLE WHEEL

James W. Pattison, Detroit, Mich., assignor to Kelsey-Hayes Wheel Company, Detroit, Mich., a corporation of Delaware Application August 10, 1936, Serial No. 95,231

6 Claims. (Cl. 301—108)

The invention relates to vehicle wheels and refers more particularly to the means for securing cover plates to the wheel bodies.

The invention has for one of its objects to provide an improved construction of cover plate securing means which is adapted for use particularly with a wheel body normally providing but limited space for the securing means. The invention has for another object to provide for securing the cover plate securing means to the inboard side of the wheel body and to provide for extending the securing means to the outboard side of the wheel body for engagement with the cover plate.

With these and other objects in view, the invention resides in the novel features of construction and combinations and arrangements of parts as more fully hereinafter set forth.

In the drawing:

Figure 1 is a front elevation, partly broken away, showing a vehicle wheel embodying my invention;

Figures 2 and 3 are cross sections on the lines 2—2 and 3—3 respectively of Figure 1.

As illustrated in the present instance, the vehicle wheel comprises the wheel body 1 which is of the demountable bolted-on type and the rim member 2 which is a tire carrying rim preferably of the drop-center type. The wheel body has the inner portion 3, the outer portion 4 and the annular portion 5 intermediate and connected to the inner and outer portions. This annular portion extends generally axially in an outboard direction from the outer edge of the inner portion to the inner edge of the outer portion. The outer portion is formed with a peripheral flange to which the rim member is secured by suitable means, such as the rivets 6.

The inner portion 3 forms the bolting-on flange and extends generally radially and is preferably provided at its inner edge with the pilot flange 7 for assisting in guiding the wheel body while it is being mounted upon the hub 8. The inner portion has the annular series of holes 9 for receiving the bolts 10 and nuts 11, which detachably secure the wheel body to the fixed radial flange 12 of the hub. The holes 9 are preferably located in the bosses 13 which are embossed in an outboard direction. 14 are bosses between the bosses 13 and also embossed in an outboard direction. These bosses 14 are radial bosses and in effect form radial reinforcing ribs. Furthermore, these bosses 14 are centrally radially ribbed in an inboard direction at 15. The construction is such that seats are provided upon the inner portion 3 radially outwardly and inwardly of the bolting-on circle for engaging either the fixed flange 12 or, as shown in the present instance, the web 16 of the brake drum, this web being at the outboard side of the fixed flange. It is to be noted that the radially outer seats are radially outward from the bosses 13 and separated by the bosses 14 while the radially inner seat is continuous. With this construction the axial depth within the confines of the wheel body and on the outboard side of the bosses 14 is relatively small.

17 is the cover plate which, as shown in the present instance, is a hub cap, the outboard surface of which forms in effect a continuation of the outboard surface of the outer portion 4 of the wheel body. This hub cap has the peripheral inturned flange 18 which is adapted to rest against the wheel body in the zone of the junction between the outer portion 4 and the intermediate annular portion 5. This flange, as shown, terminates in the transverse bead or flange 19. 20 are resilient sheet metal clips for detachably securing the cover plate in place. Each of these clips has the radially extending end portion 21 which is secured to the inboard side of a boss 14 and more particularly the rib 15 of this boss. Each clip has the generally axially extending portion 22 which extends through a hole 23 formed in the radially outer end of the boss 14 and presents the inclined axially outer end portion 24 over which the bead 19 is adapted to ride when the cover plate is being secured in place. The portion 22 is formed to provide a shoulder in an inboard direction from and adjacent to the portion 24 for engaging the bead 19 and resiliently holding the cover plate in place and against the wheel body.

For the purpose of increasing the flexibility of the spring clips, each is formed with the U-shaped portion 25 between the portions 21 and 22. It will be noted that the rib 15, in addition to serving as a reinforcement for the boss 14, also serves to increase the length of the resilient clip secured thereto. Furthermore, it will be noted that the axial depths of the boss 14 and the associated rib 15 are such that the resilient clip secured to this rib and also the rivet 26 for securing this clip to this rib clear the web 16, or, if this web is not present, the fixed flange 12 when the wheel is mounted upon the hub.

What I claim as my invention is:

1. In a vehicle wheel, the combination with a wheel body having inner and outer portions and a generally axially extending annular portion connecting said inner and outer portions, said inner portion having an annular series of bolt receiving holes and portions between said holes embossed in an outboard direction, said embossed portions having axially inwardly projecting ribs, of means for detachably securing a cover plate to said wheel body comprising a resilient clip secured to the inboard side of one of said ribs and extending through said inner portion and terminating beyond the outboard side of the latter adjacent said annular portion for engagement with a cover plate, said clip having a U-shaped portion.

2. In a vehicle wheel, the combination with a wheel body having an inner portion forming a bolting-on flange for the wheel body and having an axially inwardly projecting rib on the inner portion, of means for detachably securing a cover plate to the wheel body comprising a resilient clip secured to the inboard side of the rib on said inner portion and extending through an opening in the wheel body to a position substantially beyond the outboard side of the portion of the wheel body having the opening for engagement with the cover plate.

3. In a vehicle wheel, the combination with a wheel body having angularly spaced openings through a portion thereof and having an axially inwardly extending rib located radially inwardly of each of the openings, of means for detachably securing a cover plate to said wheel body comprising resilient clips secured to the inboard side of said ribs and extending through the openings to a position substantially beyond the outboard side of the portions of the wheel body having the openings for engagement with the cover plate.

4. In a vehicle wheel, the combination with a wheel body having an inner portion provided with an annular series of bolt receiving openings and having portions between the bolt receiving openings embossed in an outboard direction, said embossed portions having axially inwardly embossed radially extending ribs and said vehicle body having openings therethrough radially beyond the ribs, of means for detachably securing a cover plate to said wheel body comprising resilient clips respectively secured to the inboard sides of said ribs and extending through said openings to a position substantially beyond the outboard side of said inner portion for engagement with the cover plate.

5. In a vehicle wheel, the combination with a wheel body having an inner portion forming a bolting-on flange for the wheel body and having radially inner and outer portions with the latter offset axially outwardly from the former and provided with an opening therethrough, of means for detachably securing a cover plate to said wheel body comprising a resilient clip having one end secured to the inboard side of said radially inner portion and having the opposite end portion extending freely through the opening in said axially outwardly offset portion to a position beyond the outboard side of said latter portion for engagement with the cover plate, said opposite end portion connected to the fixed end portion by an axially inwardly projecting reverse curved portion cooperating with the offset relationship of said radially inner and outer portions to increase the resilient length of said clip.

6. In a vehicle wheel, the combination with a wheel body having an inner portion formed with portions offset axially relative to each other, the outboard portion being provided with openings therethrough, of means for detachably securing a cover plate to said wheel body comprising a resilient clip secured to the inboard side of the inboard portion and extending through one of the openings to a position beyond the outboard side of said inner portion for engagement with the cover plate.

JAMES W. PATTISON.